(12) United States Patent
Qian

(10) Patent No.: US 11,520,427 B2
(45) Date of Patent: *Dec. 6, 2022

(54) TOUCHSCREEN DEVICE AND METHOD AND APPARATUS FOR PERFORMING OPERATION

(71) Applicant: HUAWEI TECHNOLOGIES CO., LTD., Guangdong (CN)

(72) Inventor: Li Qian, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/122,620

(22) Filed: Dec. 15, 2020

(65) Prior Publication Data
US 2021/0096681 A1 Apr. 1, 2021

Related U.S. Application Data

(63) Continuation of application No. 16/139,726, filed on Sep. 24, 2018, now Pat. No. 10,884,537, which is a
(Continued)

(51) Int. Cl.
G06F 3/041 (2006.01)
G06F 3/0488 (2022.01)

(52) U.S. Cl.
CPC .......... *G06F 3/0414* (2013.01); *G06F 3/0412* (2013.01); *G06F 3/0488* (2013.01)

(58) Field of Classification Search
CPC .... G06F 3/0414; G06F 3/0412; G06F 3/0488; G06F 3/041; G06F 3/045; G06F 3/02; G09G 5/00
See application file for complete search history.

(56) References Cited

U.S. PATENT DOCUMENTS 9,922,347 B1* 3/2018 Burcham .............. G06F 3/0482
2009/0027353 A1* 1/2009 Im ........................ G06F 3/0416
345/173
(Continued)

FOREIGN PATENT DOCUMENTS

CN 101441548 A 5/2009
CN 101765825 A 6/2010
(Continued)

*Primary Examiner* — Pegeman Karimi
(74) *Attorney, Agent, or Firm* — Womble Bond Dickinson (US) LLP

(57) ABSTRACT

Embodiments of the present invention disclose a touchscreen device, and a method and an apparatus for performing an operation that relate to the field of information technologies, so as to reduce a limitation of identifiable operations provided to a user, and improve user experience. The method includes: detecting, by a touchscreen device, pressing force track information of a user on a touchscreen, where the pressing force track information is used to represent a change of a pressing force level in a process in which the user continuously presses the touchscreen; determining an operation corresponding to the pressing force track information, according to a current touch operation application scenario and correspondences between pressing force track information and operations; and performing the operation. The present invention is applicable to a touchscreen device that determines a corresponding operation according to pressing force track information of a user and performs the operation.

6 Claims, 6 Drawing Sheets

Related U.S. Application Data continuation of application No. PCT/CN2016/077425, filed on Mar. 25, 2016.

(56) References Cited

U.S. PATENT DOCUMENTS

| 2010/0026640 | A1 | 2/2010 | Kim et al. | |
|---|---|---|---|---|
| 2018/0107377 | A1* | 4/2018 | Ohki | H05K 999/99 |
| 2018/0284915 | A1* | 10/2018 | Kim | G06F 3/0442 |

FOREIGN PATENT DOCUMENTS

| CN | 102112946 | A | 6/2011 |
| CN | 202632268 | U | 12/2012 |
| CN | 104252303 | A | 12/2014 |
| CN | 105159548 | A | 12/2015 |
| CN | 105183319 | A | 12/2015 |

\* cited by examiner

TOUCHSCREEN DEVICE AND METHOD AND APPARATUS FOR PERFORMING OPERATION

CROSS-REFERENCE TO RELATED APPLICATIONS

This application is a continuation of U.S. patent application Ser. No. 16/139,726, filed on Sep. 24, 2018, which is a continuation of International Application No. PCT/CN2016/077425, filed on Mar. 25, 2016, All of the afore-mentioned patent applications are hereby incorporated by reference in their entireties.

TECHNICAL FIELD

The present invention relates to the field of information technologies, and in particular, to a touchscreen device, and a method and an apparatus for performing an operation.

BACKGROUND

Force Touch develops with development of information technologies. Force Touch is a touch sensing technology used by Apple on various touchscreen devices. With the technology, a touchscreen device can perceive a user's press, so as to implement a corresponding function. Specifically, the touchscreen device can detect that a user firmly presses a position on a touchscreen or a button on the touchscreen, so as to perform a corresponding operation. For example, the touchscreen device detects that the user firmly presses an address that is displayed on the touchscreen, so that a location map corresponding to the address can be previewed.

However, when the touchscreen device detects a user's firm press, so as to perform a corresponding operation, the user firmly presses a position on the touchscreen or a button on the touchscreen, and only a single operation can be performed. Therefore, identifiable operations that can be provided to a user are still quite limited at present, resulting in relatively low user experience.

SUMMARY

The present invention provides a touchscreen device and a method and an apparatus for performing an operation, so as to reduce a limitation of identifiable operations provided to a user, and improve user experience.

According to a first aspect, an embodiment of the present invention provides a method for performing an operation, where the method includes:

detecting, by a touchscreen device, pressing force track information of a user on a touchscreen, where the pressing force track information is used to represent a change of a pressing force level in a process in which the user continuously presses the touchscreen;

determining, by the touchscreen device, an operation corresponding to the pressing force track information, according to a current touch operation application scenario and correspondences between pressing force track information and operations; and performing, by the touchscreen device, the operation.

With reference to the first aspect, in a first possible implementation manner of the first aspect, the step of detecting, by a touchscreen device, pressing force track information of a user on a touchscreen specifically includes:

continuously detecting, by the touchscreen device, a touch behavior of the user on the touchscreen, and obtaining a pressing force of the user on the touchscreen in one touch process, to obtain at least one pressing force value, where the touch process is a process in which the user starts touching the touchscreen until the user stops touching the touchscreen;

determining, by the touchscreen device, a pressing force level corresponding to each of the at least one pressing force value; and determining, by the touchscreen device, the pressing force track information according to the pressing force level corresponding to each pressing force value.

With reference to the first possible implementation manner of the first aspect, in a second possible implementation manner of the first aspect, the pressing force track information further includes duration corresponding to each pressing force level.

With reference to the second possible implementation manner of the first aspect, in a third possible implementation manner of the first aspect, before the step of determining, by the touchscreen device, an operation corresponding to the pressing force track information, according to a current touch operation application scenario and correspondences between pressing force track information and operations, the method further includes:

obtaining, by the touchscreen device, the correspondences between pressing force track information and operations and in different touch operation application scenarios.

With reference to the third possible implementation manner of the first aspect, in a fourth possible implementation manner of the first aspect, after the step of determining, by the touchscreen device, a pressing force level corresponding to each of the at least one pressing force value, the method further includes:

outputting, by the touchscreen device, each pressing force level in a particular presentation way, where the particular presentation way includes a sound, an image, and a vibration.

According to a second aspect, an embodiment of the present invention provides an apparatus for performing an operation, where the apparatus includes:

a detection unit, located in a touchscreen device, configured to detect pressing force track information of a user on a touchscreen, where the pressing force track information is used to represent a change of a pressing force level in a process in which the user continuously presses the touchscreen;

a determining unit, located in the touchscreen device, configured to determine an operation corresponding to the pressing force track information, according to a current touch operation application scenario and correspondences between pressing force track information and operations; and an execution unit, located in the touchscreen device, configured to perform the operation.

With reference to the second aspect, in a first possible implementation manner of the second aspect, the detection unit specifically includes a detection module, an obtaining module, and a determining module, where the detection module, located in the touchscreen device, is configured to continuously detect a touch behavior of the user on the touchscreen;

the obtaining module, located in the touchscreen device, is configured to obtain a pressing force of the user on the touchscreen in one touch process, to obtain at least one pressing force value, where the touch process is a process in which the user starts touching the touchscreen until the user stops touching the touchscreen;

the determining module, located in the touchscreen device, is configured to determine a pressing force level corresponding to each of the at least one pressing force value; and the determining module, located in the touchscreen device, is further configured to determine the pressing force track information according to the pressing force level corresponding to each pressing force value.

With reference to the first possible implementation manner of the second aspect, in a second possible implementation manner of the second aspect, the pressing force track information further includes duration corresponding to each pressing force level.

With reference to the second possible implementation manner of the second aspect, in a third possible implementation manner of the second aspect, the apparatus further includes an obtaining unit, where the obtaining unit, located in the touchscreen device, is configured to obtain the correspondences between pressing force track information and operations and in different touch operation application scenarios.

With reference to the third possible implementation manner of the second aspect, in a fourth possible implementation manner of the second aspect, the apparatus further includes an output unit, where the output unit, located in the touchscreen device, is configured to output each pressing force level in a particular presentation way, where the particular presentation way includes a sound, an image, and a vibration.

According to a third aspect, an embodiment of the present invention provides a touchscreen device, including a memory, a processor, and a transceiver, where the memory, located in the touchscreen device, is configured to store program code to be executed by the processor; and the processor, located in the touchscreen device, is configured to call the program code stored in the memory, and perform operations according to the program code: detecting pressing force track information of a user on a touchscreen, where the pressing force track information is used to represent a change of a pressing force level in a process in which the user continuously presses the touchscreen; determining an operation corresponding to the pressing force track information, according to a current touch operation application scenario and correspondences between pressing force track information and operations; and performing the operation.

With reference to the third aspect, in a first possible implementation manner of the third aspect, the processor, located in the touchscreen device, is specifically configured to call the program code stored in the memory, and perform operations according to the program code: continuously detecting a touch behavior of the user on the touchscreen; obtaining a pressing force of the user on the touchscreen in one touch process, to obtain at least one pressing force value; determining a pressing force level corresponding to each of the at least one pressing force value; and determining the pressing force track information according to the pressing force level corresponding to each pressing force value, where the touch process is a process in which the user starts touching the touchscreen until the user stops touching the touchscreen.

With reference to the first possible implementation manner of the third aspect, in a second possible implementation manner of the third aspect, the pressing force track information further includes duration corresponding to each pressing force level.

With reference to the second possible implementation manner of the third aspect, in a third possible implementation manner of the third aspect, the processor, located in the touchscreen device, is further configured to call the program code stored in the memory, and perform an operation according to the program code: obtaining the correspondences between pressing force track information and operations and in different touch operation application scenarios.

With reference to the third possible implementation manner of the third aspect, in a fourth possible implementation manner of the third aspect, the processor, located in the touchscreen device, is further configured to call the program code stored in the memory, and perform an operation according to the program code: outputting each pressing force level in a particular presentation way, where the particular presentation way includes a sound, an image, and a vibration.

According to the touchscreen device, and the method and the apparatus for performing an operation that are provided in the present invention, the touchscreen device first detects pressing force track information of a user on a touchscreen, where the pressing force track information is used to represent a change of a pressing force level in a process in which the user continuously presses the touchscreen; then determines an operation corresponding to the pressing force track information, according to a current touch operation application scenario and correspondences between pressing force track information and operations; and finally performs the operation. Unlike that a touchscreen device detects a user's press, so as to perform a corresponding operation at present, the touchscreen device in the present invention can determine, by detecting pressing force track information of a user on a touchscreen, an operation corresponding to the pressing force track information. That is, the user presses a position on the touchscreen, so that different pressing force track information is obtained, and different operations can be determined and performed. Therefore, more identifiable operations can be provided to the user, a limitation of identifiable operations provided to a user can be reduced, and user experience can be improved.

BRIEF DESCRIPTION OF DRAWINGS

To describe the technical solutions in the present invention more clearly, the following briefly describes the accompanying drawings required for describing the present invention. Apparently, the accompanying drawings in the following description only show some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are only some but not all of the embodiments of the present invention. All other embodiments obtained by a person of ordinary skill in the art based on the embodiments of the present invention without creative efforts shall fall within the protection scope of the present invention.

Figure 1:
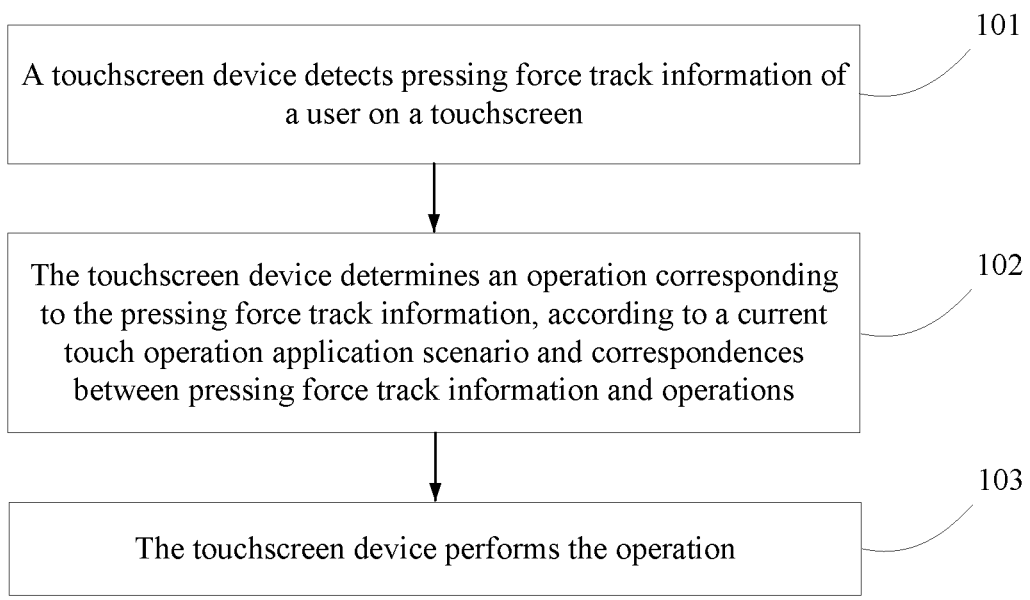
FIG. 1 is a flowchart of a method for performing an operation according to an embodiment of the present invention.

An embodiment of the present invention provides a method for performing an operation, so as to reduce a limitation of identifiable operations provided to a user, and improve user experience. As shown in FIG. 1, the method includes the following steps.

101. A touchscreen device detects pressing force track information of a user on a touchscreen.

The pressing force track information is used to represent a change of a pressing force level in a process in which the user continuously presses the touchscreen.

The pressing force track information further includes duration corresponding to each pressing force level.

In this embodiment of the present invention, the pressing force track information includes: the pressing force level, or the pressing force level and the duration corresponding to each pressing force level.

In this embodiment of the present invention, the touchscreen device continuously detects a press of the user on the touchscreen and obtains a pressing force value, to determine a pressing force level corresponding to each pressing force value, or a pressing force level corresponding to each pressing force value and duration corresponding to the pressing force level, and determine the pressing force track information of the user on the touchscreen.

For example, the pressing force track information may include strong. The pressing force track information may include strong, weak, and strong. Alternatively, the pressing force track information may include strong and long duration, weak and short duration, and strong and long duration.

In this embodiment of the present invention, the user may input, into the touchscreen device, a correspondence between a pressing force value and a pressing force level and/or a correspondence between a pressing time and a duration level. Alternatively, the touchscreen device may set a correspondence between a pressing force value and a pressing force level and/or a correspondence between a pressing time and a duration level. This is not limited in this embodiment of the present invention.

For example, a pressing force level corresponding to a pressing force value 0.5-1 N is weak, a pressing force level corresponding to a pressing force value 1-2 N is medium, and a pressing force level corresponding to a pressing force value 2-3 N is strong. A duration level corresponding to a pressing time 1-3 s is short duration, a duration level corresponding to a pressing time 3-5 s is medium duration, and a duration level corresponding to a pressing time 5-7 s is long duration.

102. The touchscreen device determines an operation corresponding to the pressing force track information, according to a current touch operation application scenario and correspondences between pressing force track information and operations.

The touch operation application scenario includes: an operation screen on which a current touch is performed, an application program on which the current touch is performed, an operation object of the current touch, and a position, of the current touch, in a screen region.

In this embodiment of the present invention, the touchscreen device can determine the current touch operation application scenario, and can determine the operation corresponding to the pressing force track in the current application scenario. In different application scenarios, operations corresponding to a same pressing force track are different.

103. The touchscreen device performs the operation.

In this embodiment of the present invention, a track event mapping table is stored in the touchscreen device. The track event mapping table stores correspondences, in different application scenarios, between pressing force tracks and operations. After the touchscreen device determines the operation corresponding to the detected pressing force track in the current application scenario, the touchscreen device performs the operation.

According to the method for performing an operation in this embodiment of the present invention, a touchscreen device first detects pressing force track information of a user on a touchscreen, where the pressing force track information is used to represent a change of a pressing force level in a process in which the user continuously presses the touchscreen; then determines an operation corresponding to the pressing force track information, according to a current touch operation application scenario and correspondences between pressing force track information and operations; and finally performs the operation. Unlike that a touchscreen device detects a user's press, so as to perform a corresponding operation at present, the touchscreen device in this embodiment of the present invention can determine, by detecting pressing force track information of a user on a touchscreen, an operation corresponding to the pressing force track information. That is, the user presses a position on the touchscreen, so that different pressing force track information is obtained, and different operations can be determined and performed. Therefore, more identifiable operations can be provided to the user, a limitation of identifiable operations provided to a user can be reduced, and user experience can be improved.

Figure 2:
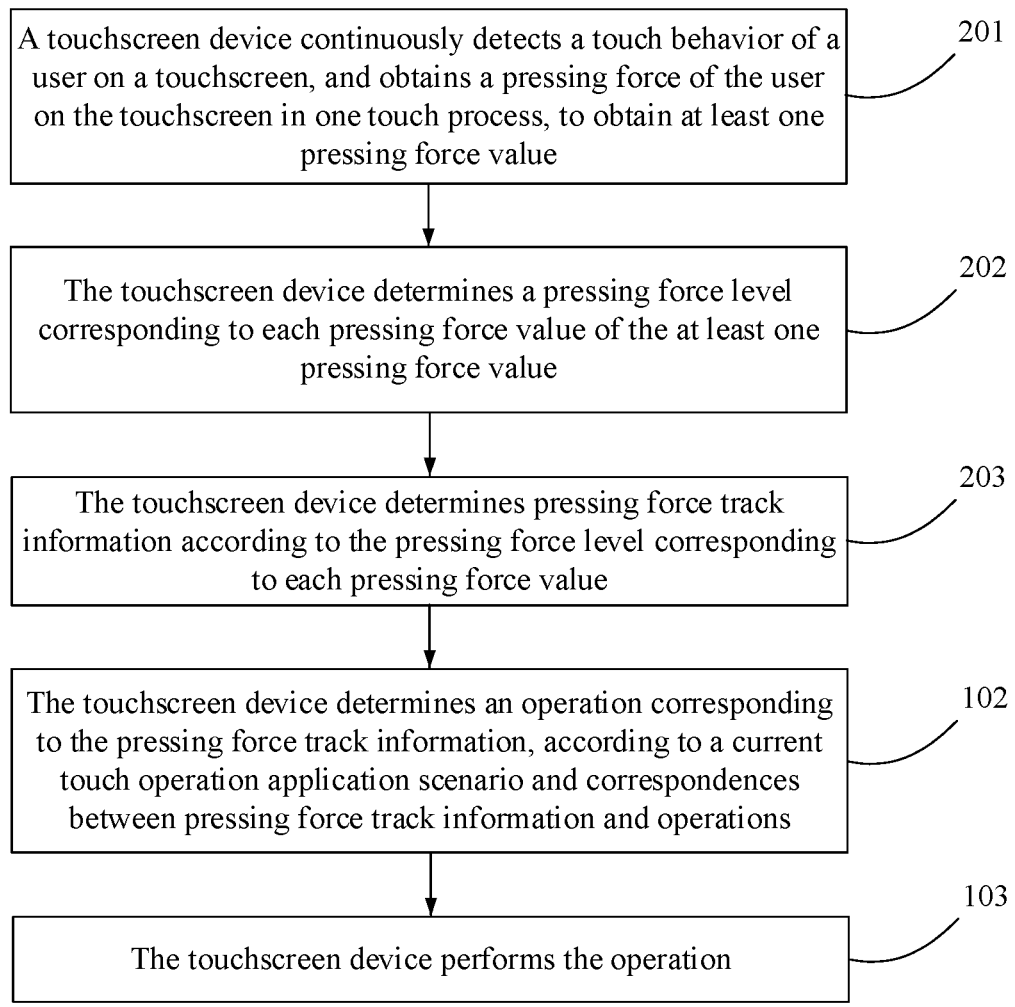
FIG. 2 is a flowchart of another method for performing an operation according to an embodiment of the present invention.

In another possible implementation manner of the embodiments of the present invention, based on FIG. 1, step 101 that a touchscreen device detects pressing force track information of a user on a touchscreen specifically includes step 201 to step 203 shown in FIG. 2.

201. The touchscreen device continuously detects a touch behavior of the user on the touchscreen, and obtains a pressing force of the user on the touchscreen in one touch process, to obtain at least one pressing force value.

The touch process is a process in which the user starts touching the touchscreen until the user stops touching the touchscreen.

In this embodiment of the present invention, before step 201, the method further includes: obtaining, by the touchscreen device, a user inputted correspondence between a pressing force value and a pressing force level, or setting, by the touchscreen device, a correspondence between a pressing force value and a pressing force level.

202. The touchscreen device determines a pressing force level corresponding to each of the at least one pressing force value.

203. The touchscreen device determines the pressing force track information according to the pressing force level corresponding to each pressing force value.

In this embodiment of the present invention, each time a pressing force value is obtained, the touchscreen device may determine a pressing force level corresponding to the pressing force value, and therefore, determines pressing force track information. Alternatively, the touchscreen device obtains all presses of the user on the touchscreen in one touch process of the user, determines pressing force levels, and therefore, determines pressing force track information.

Figure 3:
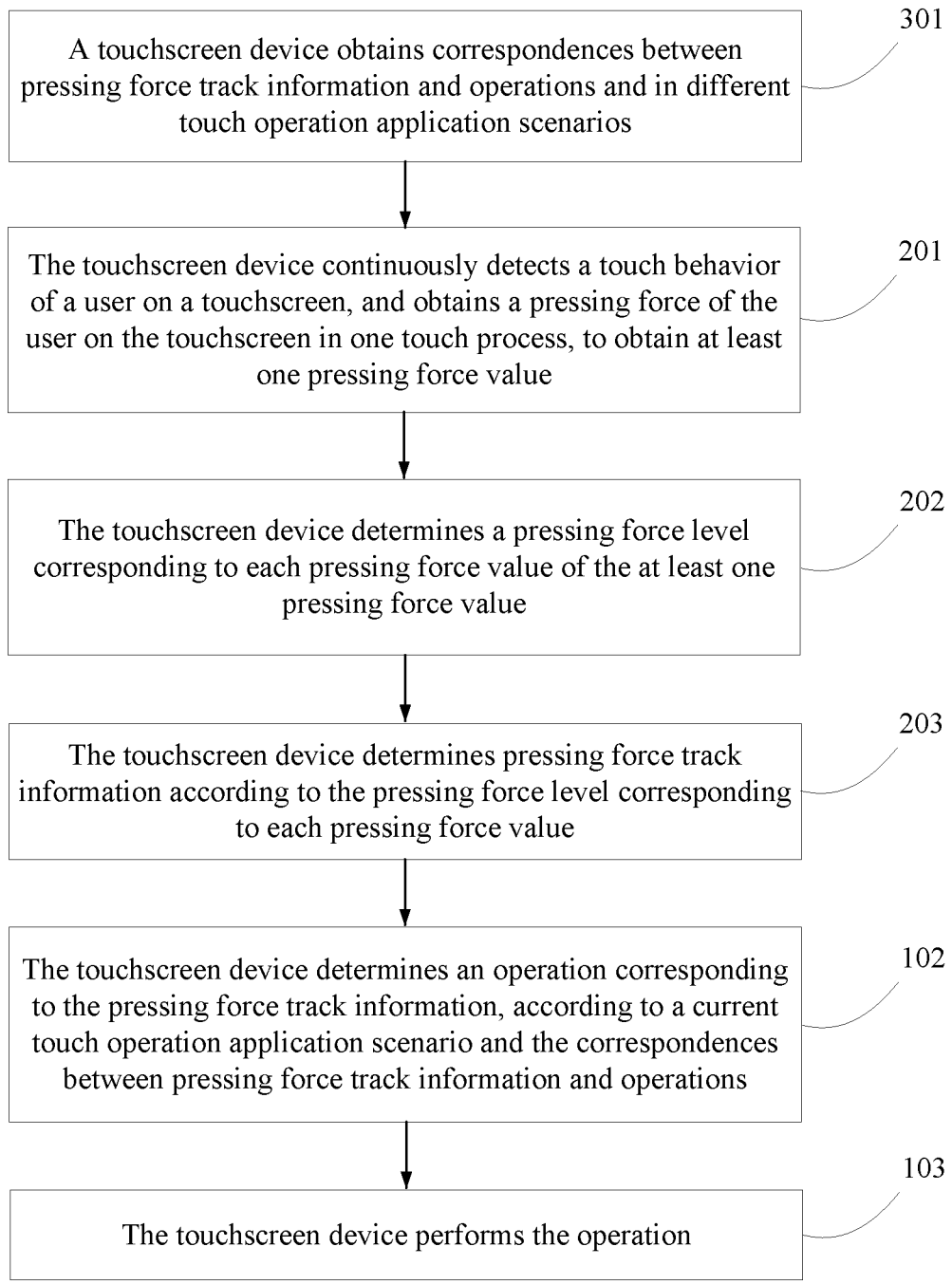
FIG. 3 is a flowchart of still another method for performing an operation according to an embodiment of the present invention.

In another possible implementation manner of the embodiments of the present invention, based on FIG. 2, before step 102 that the touchscreen device determines an operation corresponding to the pressing force track information, according to a current touch operation application scenario and correspondences between pressing force track information and operations, the method further includes step 301 shown in FIG. 3.

301. The touchscreen device obtains the correspondences between pressing force track information and operations and in different touch operation application scenarios.

In this embodiment of the present invention, the user may set the correspondences between pressing force track information and operations and in different touch operation application scenarios. Alternatively, the touchscreen device may set the correspondences between pressing force track information and operations and in different touch operation application scenarios. This is not limited in this embodiment of the present invention.

For example, in an application scenario of a video application program, an operation corresponding to pressing force track information that includes strong, strong, and strong is increasing a volume; an operation corresponding to pressing force track information that includes strong, weak, and weak is increasing brightness; and an operation corresponding to pressing force track information that includes strong, weak, and strong is fast-forwarding. In a position of a home screen, an operation corresponding to pressing force track information that includes strong, weak, and strong is entering a privacy mode. In an application scenario of a mailbox application program, an operation corresponding to pressing force track information that includes strong and long duration, and weak and long duration is viewing a new message; and an operation corresponding to pressing force track information that includes strong and short duration, and strong and long duration is adding an attachment.

Figure 4:
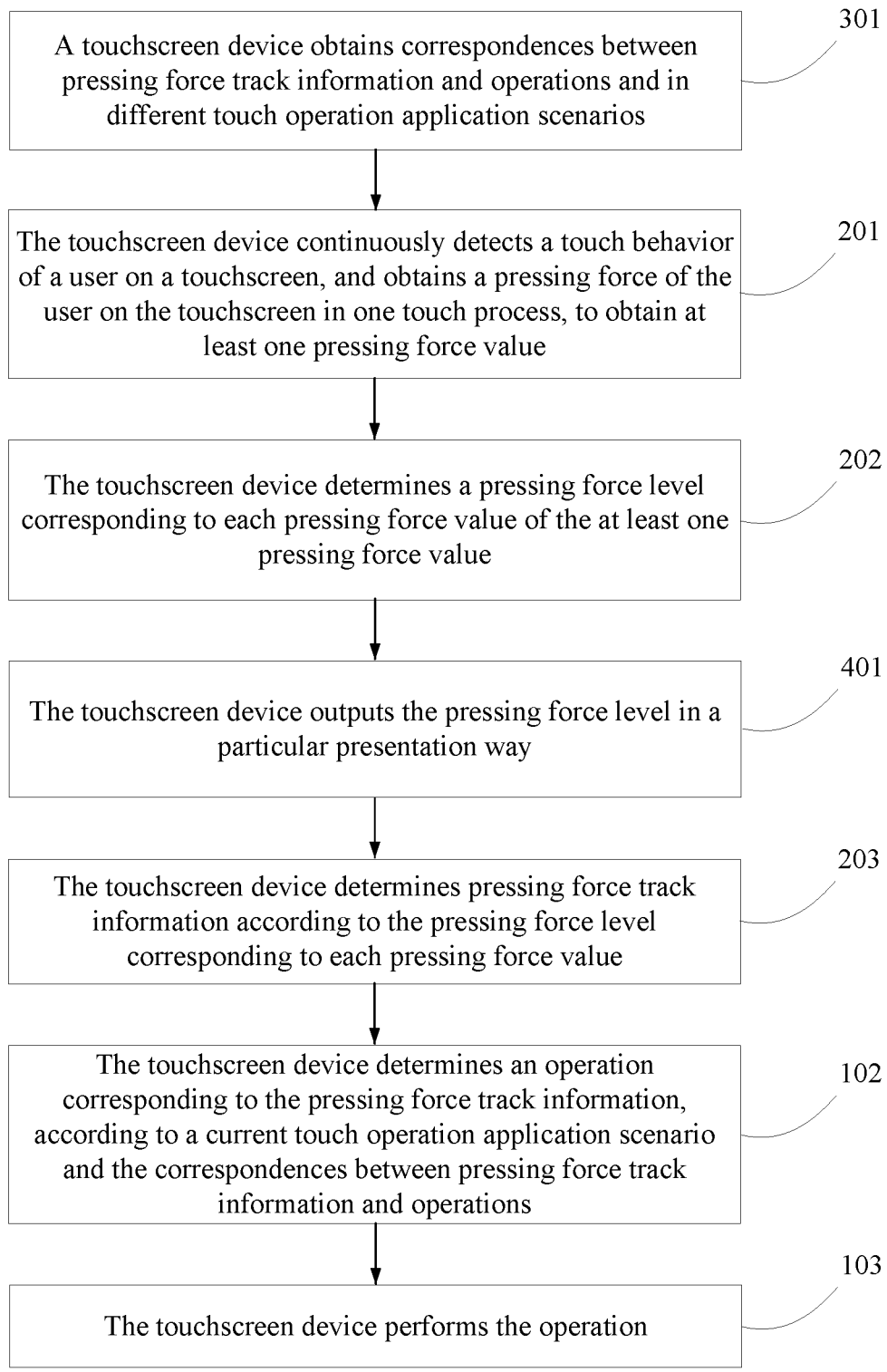
FIG. 4 is a flowchart of still another method for performing an operation according to an embodiment of the present invention.

In another possible implementation manner of the embodiments of the present invention, based on FIG. 3, after step 202 that the touchscreen device determines a pressing force level corresponding to each of the at least one pressing force value, the method further includes step 401 shown in FIG. 4.

401. The touchscreen device outputs the pressing force level in a particular presentation way.

The particular presentation way includes a sound, an image, and a vibration.

In this embodiment of the present invention, each time a pressing force level is determined, the touchscreen device may output the pressing force level in the particular presentation way. Alternatively, the touchscreen device determines all pressing force levels in one pressing process, and outputs each pressing force level one after another in the particular presentation way. This is not limited in this embodiment of the present invention.

In this embodiment of the present invention, after determining the pressing force level of the user on the touchscreen, the touchscreen device outputs, by means of the sound, the image, or the vibration, a pressure level at which the user presses the touchscreen.

In this embodiment of the present invention, before step 401, the method further includes: setting, by the touchscreen device, correspondences between pressing force levels and different sound, image, or vibration forms; or receiving, by the touchscreen device, user inputted correspondences between pressing force levels and different sound, image, and vibration forms.

For example, when the touchscreen device outputs a sound 1, it indicates that a pressing force level of input from the user is heavy. When the touchscreen device outputs a sound 2, it indicates that a pressing force level of input from the user is medium. When the touchscreen device outputs a sound 3, it indicates that a pressing force level of input from the user is light.

In this embodiment of the present invention, when determining, by means of the sound, the image, or the vibration, that there is a deviation between an inputted pressing force level and a required pressing force level, the user may terminate a current pressing operation or re-perform a pressing operation.

In this embodiment of the present invention, a touchscreen device outputs, by means of a sound, an image, or a vibration, a pressure level of a pressing force that is inputted by the user. Therefore, the user can determine whether the inputted pressing force level is correct, a case of an incorrect operation caused by an incorrectly inputted pressing force level can be avoided, and user experience can be improved.

Figure 5:
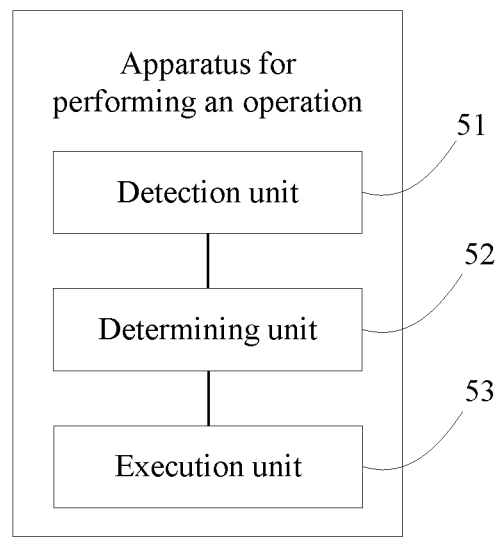
FIG. 5 is a schematic diagram of an apparatus for performing an operation according to an embodiment of the present invention.

Further, to implement the method shown in FIG. 1 to FIG. 4, an embodiment of the present invention further provides an apparatus for performing an operation, so as to reduce a limitation of identifiable operations provided to a user, and improve user experience. As shown in FIG. 5, the apparatus includes a detection unit 51, a determining unit 52, and an execution unit 53.

The detection unit 51, located in a touchscreen device, is configured to detect pressing force track information of a user on a touchscreen.

The pressing force track information is used to represent a change of a pressing force level in a process in which the user continuously presses the touchscreen.

The determining unit 52, located in the touchscreen device, is configured to determine an operation corresponding to the pressing force track information, according to a current touch operation application scenario and correspondences between pressing force track information and operations.

The execution unit 53, located in the touchscreen device, is configured to perform the operation.

Figure 6:
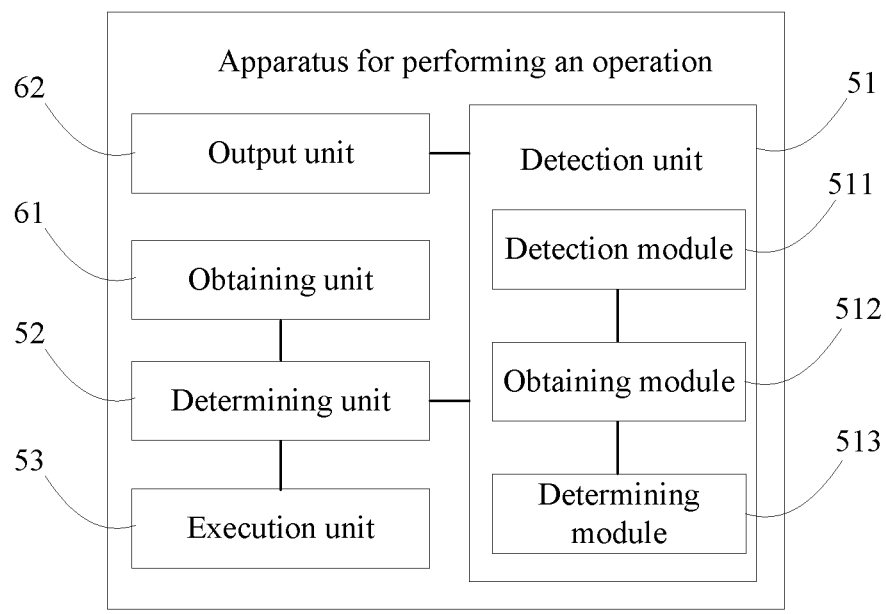
FIG. 6 is a schematic diagram of another apparatus for performing an operation according to an embodiment of the present invention.

Further, as shown in FIG. 6, the detection unit 51 specifically includes a detection module 511, an obtaining module 512, and a determining module 513.

The detection module 511, located in the touchscreen device, is configured to continuously detect a touch behavior of the user on the touchscreen.

The obtaining module 512, located in the touchscreen device, is configured to obtain a pressing force of the user on the touchscreen in one touch process, to obtain at least one pressing force value.

The touch process is a process in which the user starts touching the touchscreen until the user stops touching the touchscreen.

The determining module 513, located in the touchscreen device, is configured to determine a pressing force level corresponding to each of the at least one pressing force value.

The determining module 513, located in the touchscreen device, is further configured to determine the pressing force track information according to the pressing force level corresponding to each pressing force value.

The pressing force track information further includes duration corresponding to each pressing force level.

Further, as shown in FIG. 6, the apparatus further includes an obtaining unit 61.

The obtaining unit 61, located in the touchscreen device, is configured to obtain the correspondences between pressing force track information and operations and in different touch operation application scenarios.

Further, as shown in FIG. 6, the apparatus further includes an output unit 62.

The output unit 62, located in the touchscreen device, is configured to output each pressing force level in a particular presentation way.

The particular presentation way includes a sound, an image, and a vibration.

According to the apparatus for performing an operation in this embodiment of the present invention, a touchscreen device first detects pressing force track information of a user on a touchscreen, where the pressing force track information is used to represent a change of a pressing force level in a process in which the user continuously presses the touchscreen; then determines an operation corresponding to the pressing force track information, according to a current touch operation application scenario and correspondences between pressing force track information and operations; and finally performs the operation. Unlike that a touchscreen device detects a user's press, so as to perform a corresponding operation at present, the touchscreen device in this embodiment of the present invention can determine, by detecting pressing force track information of a user on a touchscreen, an operation corresponding to the pressing force track information. That is, the user presses a position on the touchscreen, so that different pressing force track information is obtained, and different operations can be determined and performed. Therefore, more identifiable operations can be provided to the user, a limitation of identifiable operations provided to a user can be reduced, and user experience can be improved.

Further, an embodiment of the present invention further provides another apparatus for performing an operation. A touchscreen device outputs, by means of a sound, an image, or a vibration, a pressure level of a pressing force that is inputted by a user. Therefore, the user can determine whether the inputted pressing force level is correct, a case of an incorrect operation caused by an incorrectly inputted pressing force level can be avoided, and user experience can be improved.

It should be noted that for other corresponding descriptions of the units of the apparatus, for performing an operation, provided in this embodiment of the present invention, refer to corresponding descriptions in FIG. 1, FIG. 2, FIG. 3, and FIG. 4. Details are not described herein.

Figure 7:
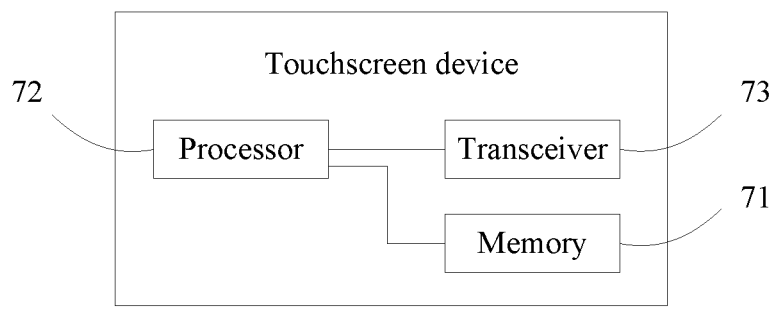
FIG. 7 is a schematic structural diagram of operation performing according to an embodiment of the present invention.

Still further, an embodiment of the present invention further provides a touchscreen device. As shown in FIG. 7, the apparatus includes a memory 71, a processor 72, and a transceiver 73. Both the transceiver 73 and the memory 71 are connected to the processor 72. FIG. 7 depicts a structure of a touchscreen device according to another embodiment of the present invention, and the touchscreen device is configured to execute an authorization method, implemented by the touchscreen device, in the embodiments of FIG. 1 to FIG. 4.

The memory 71, located in the touchscreen device, is configured to store program code to be executed by the processor.

The processor 72, located in the touchscreen device, is configured to call the program code stored in the memory, and perform operations according to the program code: detecting pressing force track information of a user on a touchscreen, where the pressing force track information is used to represent a change of a pressing force level in a process in which the user continuously presses the touchscreen; determining an operation corresponding to the pressing force track information, according to a current touch operation application scenario and correspondences between pressing force track information and operations; and performing the operation.

The processor 72, located in the touchscreen device, is specifically configured to call the program code stored in the memory, and perform operations according to the program code: continuously detecting a touch behavior of the user on the touchscreen; obtaining a pressing force of the user on the touchscreen in one touch process, to obtain at least one pressing force value; determining a pressing force level corresponding to each of the at least one pressing force value; and determining the pressing force track information according to the pressing force level corresponding to each pressing force value.

The touch process is a process in which the user starts touching the touchscreen until the user stops touching the touchscreen. The pressing force track information further includes duration corresponding to each pressing force level.

The processor 72, located in the touchscreen device, is further configured to call the program code stored in the memory, and perform an operation according to the program code: obtaining the correspondences between pressing force track information and operations and in different touch operation application scenarios.

The processor 72, located in the touchscreen device, is further configured to call the program code stored in the memory, and perform an operation according to the program code: outputting each pressing force level in a particular presentation way.

The particular presentation way includes a sound, an image, and a vibration.

According to the touchscreen device in this embodiment of the present invention, the touchscreen device first detects pressing force track information of a user on a touchscreen, where the pressing force track information is used to represent a change of a pressing force level in a process in which the user continuously presses the touchscreen; then determines an operation corresponding to the pressing force track information, according to a current touch operation application scenario and correspondences between pressing force track information and operations; and finally performs the operation. Unlike that a touchscreen device detects a user's press, so as to perform a corresponding operation at present, the touchscreen device in this embodiment of the present invention can determine, by detecting pressing force track information of a user on a touchscreen, an operation corresponding to the pressing force track information. That is, the user presses a position on the touchscreen, so that different pressing force track information is obtained, and different operations can be determined and performed. Therefore, more identifiable operations can be provided to the user, a limitation of identifiable operations provided to a user can be reduced, and user experience can be improved.

Further, an embodiment of the present invention provides another touchscreen device. The touchscreen device outputs, by means of a sound, an image, or a vibration, a pressure level of a pressing force that is inputted by a user. Therefore, the user can determine whether the inputted pressing force level is correct, a case of an incorrect operation caused by an incorrectly inputted pressing force level can be avoided, and user experience can be improved.

It should be noted that for other corresponding descriptions of the units of the apparatus, for performing an operation, provided in this embodiment of the present invention, refer to corresponding descriptions in FIG. 1, FIG. 2, FIG. 3, and FIG. 4. Details are not described herein.

The apparatus, for performing an operation, provided in the embodiments of the present invention can implement the foregoing method embodiments. For specific function implementation, refer to descriptions in the method embodiments, and details are not described. The method and the apparatus, for implementing a system operation, provided in the embodiments of the present invention can be applicable to a touchscreen device that determines a corresponding operation according to pressing force track information of a user and performs the operation. However, the present invention imposes no limitation thereon.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), a random access memory (Random Access Memory, RAM), or the like.

The foregoing descriptions are only specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for performing an operation, comprising:
   detecting, by a touchscreen device, pressing force track information of a user on a touchscreen of the touchscreen device, wherein the pressing force track information is to represent a change of a pressing force level in a process in which the user continuously presses the touchscreen;
   determining, by the touchscreen device, an operation corresponding to the pressing force track information, according to a current touch operation application scenario and correspondences between pressing force track information and operations; and
   performing, by the touchscreen device, the operation corresponding to the pressing force track information.

2. The method according to claim 1, wherein the detecting of the pressing force track information of the user on the touchscreen comprises:
   continuously detecting, by the touchscreen device, a touch behavior of the user on the touchscreen, and obtaining a pressing force of the user on the touchscreen in a touch process, to obtain at least one pressing force value, wherein the touch process is a process in which the user starts touching the touchscreen until the user stops touching the touchscreen;
   determining, by the touchscreen device, a pressing force level corresponding to each of the at least one pressing force value; and
   determining, by the touchscreen device, the pressing force track information according to the pressing force level corresponding to each pressing force value.

3. An apparatus for performing an operation, comprising:
   a detection circuit, located in a touchscreen device, configured to detect pressing force track information of a user on a touchscreen of the touchscreen device, wherein the pressing force track information is to represent a change of a pressing force level in a process in which the user continuously presses the touchscreen;
   a determining circuit, located in the touchscreen device, configured to determine an operation corresponding to the pressing force track information, according to a current touch operation application scenario and correspondences between pressing force track information and operations; and
   an execution circuit, located in the touchscreen device, configured to perform the operation corresponding to the pressing force track information.

4. The apparatus for performing an operation according to claim 3, wherein the detection circuit comprises a detection module, an obtaining module, and a determining module, wherein
   the detection module, located in the touchscreen device, is to continuously detect a touch behavior of the user on the touchscreen;
   the obtaining module, located in the touchscreen device, is to obtain a pressing force of the user on the touchscreen in a touch process, to obtain at least one pressing force value, wherein the touch process is a process in which the user starts touching the touchscreen until the user stops touching the touchscreen;
   the determining module, located in the touchscreen device, is configured to determine a pressing force level corresponding to each of the at least one pressing force value; and
   the determining module, located in the touchscreen device, is further configured to determine the pressing force track information according to the pressing force level corresponding to each pressing force value.

5. A touchscreen device, comprising;
   a memory;
   a processor; and
   a transceiver;
   wherein the memory, located in the touchscreen device, is configured to store program code to be executed by the processor; and
   wherein the processor, located in the touchscreen device, is configured to execute the program code stored in the memory to perform operations comprising:
   detecting pressing force track information of a user on a touchscreen of the touchscreen device, wherein the pressing force track information is to represent a change of a pressing force level in a process in which the user continuously presses the touchscreen; determining an operation corresponding to the pressing force track information, according to a current touch operation application scenario and correspondences between pressing force track information and operations; and performing the operation corresponding to the pressing force track information.

6. The touchscreen device according to claim 5, wherein the operations further comprise:
continuously detecting a touch behavior of the user on the touchscreen;
obtaining a pressing force of the user on the touchscreen in a touch process, to obtain at least one pressing force value;
determining a pressing force level corresponding to each of the at least one pressing force value; and
determining the pressing force track information according to the pressing force level corresponding to each pressing force value, wherein the touch process is a process in which the user starts touching the touchscreen until the user stops touching the touchscreen.

* * * * *